(12) United States Patent
Shin

(10) Patent No.: US 11,120,813 B2
(45) Date of Patent: Sep. 14, 2021

(54) IMAGE PROCESSING DEVICE, OPERATION METHOD OF IMAGE PROCESSING DEVICE, AND COMPUTER-READABLE RECORDING MEDIUM

(71) Applicant: SAMSUNG ELECTRONICS CO., LTD., Suwon-si (KR)

(72) Inventor: Ki-hoon Shin, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 154 days.

(21) Appl. No.: 16/315,511

(22) PCT Filed: Jun. 27, 2017

(86) PCT No.: PCT/KR2017/006787
§ 371 (c)(1),
(2) Date: Jan. 4, 2019

(87) PCT Pub. No.: WO2018/008885
PCT Pub. Date: Jan. 11, 2018

(65) Prior Publication Data
US 2019/0237089 A1    Aug. 1, 2019

(30) Foreign Application Priority Data
Jul. 5, 2016    (KR) .................. 10-2016-0084710

(51) Int. Cl.
*G10L 21/02*    (2013.01)
*G10L 15/22*    (2006.01)
(Continued)

(52) U.S. Cl.
CPC .............. *G10L 21/02* (2013.01); *G10L 15/04* (2013.01); *G10L 15/22* (2013.01);
(Continued)

(58) Field of Classification Search
CPC ..... G10L 21/02; G10L 21/0208; G10L 15/04; G10L 15/22; G10L 2021/02166;
(Continued)

(56) References Cited

U.S. PATENT DOCUMENTS 5,267,323 A * 11/1993 Kimura .................. G08C 23/04
381/110
6,868,045 B1    3/2005 Schröder
(Continued)

FOREIGN PATENT DOCUMENTS

EP    3 160 151 A1    4/2017
KR    20-0290369 Y1    9/2002
(Continued)

OTHER PUBLICATIONS

EPO English Translation of KR 20160049347A (Year: 2016).*
(Continued)

*Primary Examiner* — Michelle M Koeth
(74) *Attorney, Agent, or Firm* — Sughrue Mion, PLLC

(57) ABSTRACT

The present disclosure relates to an image processing device, an operation method of the image processing device, and a computer-readable recording medium. The image processing device according to an embodiment in the present disclosure may comprise: a voice-obtaining unit for obtaining the voice of a user and generating a first voice signal; a communication interface unit for receiving a second voice signal of the user from an external device; and a processor which, after the first voice signal is received from the voice-obtaining unit, performs a first pre-processing operation employing voice amplification of the received first voice signal, and, after the second voice signal is received via the communication interface unit, performs a second pre-processing operation employing noise amplification of the second voice signal.

11 Claims, 13 Drawing Sheets

(51) Int. Cl.

| | | |
|---|---|---|
| *H04N 21/422* | (2011.01) | |
| *H04N 21/439* | (2011.01) | |
| *G10L 15/04* | (2013.01) | |
| *H04R 3/00* | (2006.01) | |
| *G10L 21/0216* | (2013.01) | |
| *G10L 21/0208* | (2013.01) | |
| *H04R 1/40* | (2006.01) | |

(52) U.S. Cl.
CPC ... *H04N 21/4221* (2013.01); *H04N 21/42203* (2013.01); *H04N 21/42204* (2013.01); *H04N 21/42222* (2013.01); *H04N 21/439* (2013.01); *H04R 3/005* (2013.01); *G10L 21/0208* (2013.01); *G10L 2021/02166* (2013.01); *H04R 1/406* (2013.01); *H04R 2420/07* (2013.01); *H04R 2499/15* (2013.01)

(58) Field of Classification Search
CPC ....... H04N 21/42203; H04N 21/42204; H04N 21/4221; H04N 21/42222; H04N 21/439; H04R 3/005; H04R 1/406; H04R 2420/07; H04R 2499/15
See application file for complete search history.

(56) References Cited

U.S. PATENT DOCUMENTS

| | | | |
|---|---|---|---|
| 7,260,538 | B2 | 8/2007 | Calderone et al. |
| 8,849,657 | B2 | 9/2014 | Shin |
| 8,948,415 | B1 | 2/2015 | Reid et al. |
| 10,115,395 | B2 | 10/2018 | Heo |
| 2005/0013443 | A1 | 1/2005 | Marumoto et al. |
| 2006/0179451 | A1 | 8/2006 | Sung |
| 2011/0242269 | A1 | 10/2011 | Nöthlings et al. |
| 2012/0058803 | A1* | 3/2012 | Nicholson ............ H04M 1/605 455/570 |
| 2012/0316876 | A1 | 12/2012 | Jang et al. |
| 2013/0110508 | A1 | 5/2013 | Bak et al. |
| 2013/0315038 | A1* | 11/2013 | Ferren .................. G06F 3/041 367/197 |
| 2014/0181865 | A1 | 6/2014 | Koganei |
| 2014/0286497 | A1* | 9/2014 | Thyssen ................ H04R 3/005 381/66 |
| 2015/0318000 | A1 | 11/2015 | Gao |
| 2015/0356972 | A1 | 12/2015 | Kotani et al. |
| 2017/0154625 | A1 | 6/2017 | Heo |
| 2017/0352349 | A1* | 12/2017 | Vrazic .................. G01S 3/801 |

FOREIGN PATENT DOCUMENTS

| | | | |
|---|---|---|---|
| KR | 10-2004-0050224 A | | 6/2004 |
| KR | 10-2012-0011945 A | | 2/2012 |
| KR | 10-2013-0045471 A | | 5/2013 |
| KR | 20160049347 A | * | 5/2016 |
| WO | 2014/143439 A1 | | 9/2014 |
| WO | 2015/194693 A1 | | 12/2015 |

OTHER PUBLICATIONS

Communication dated Mar. 4, 2019 issued by the European Patent Office in counterpart European Application No. 17824441.4.
International Search Report (PCT/ISA/210) dated Oct. 17, 2017, issued by the International Searching Authority in counterpart International Patent Application No. PCT/KR2017/006787.
Written Opinion (PCT/ISA/237) dated Oct. 17, 2017, issued by the International Searching Authority in counterpart International Patent Application No. PCT/KR2017/006787.
Communication dated Jun. 10, 2020, issued by the European Patent Office in European Application No. 17824441.4.

* cited by examiner

210

(a) Far-talk (b) Close-talk

IMAGE PROCESSING DEVICE, OPERATION METHOD OF IMAGE PROCESSING DEVICE, AND COMPUTER-READABLE RECORDING MEDIUM

TECHNICAL FIELD

Apparatuses and methods consistent with the present disclosure relates to an image processing device, an operation method of the image processing device, and a computer-readable recording medium, and more particularly to an image processing device that enables far and near field speech recognition by recognizing different types of microphones embedded in, for example, a TV and a remote controller, an operation method of the image processing device, and a computer-readable recording medium.

BACKGROUND ART

It is well known to control a TV using speech of a single microphone (hereinafter referred to as a mic) embedded in a remote controller to control a product such as a smart TV by speech. This approach has limited performance for speech acquisition, and thus it is possible to remove only stationary (or non-stationary) noise even by applying a preprocessing technique. As a result, users avoid using the remote controller in a noisy place, or even when the users use the remote controller, the users speech by bringing the remote controller close to their mouths, frequently resulting in the deterioration of recognition due to unintended breathing.

To improve this, a multi-channel microphone-based preprocessing technique such as beam forming has been recently introduced, which is designed to have a directionality compared to single channel preprocessing, thereby advantageously removing a considerable portion of stationary noise from unwanted directions.

However, when a recognition rate is improved through preprocessing by embedding, for example, a two-channel microphone array instead of one channel in the remote controller, a microphone, an analog-digital converter (ADC) or a codec is added, and a separate digital signal processor (DSP) chip is required, leading to a rise in costs.

Also, as the power consumption of the remote controller increases, there is an inconvenience that only a two-channel preprocessing technique having a small amount of computation and very limited performance is applied.

DISCLOSURE

Technical Problem

The present disclosure provides an image processing device that enables far and near field speech recognition by recognizing different types of microphones embedded in, for example, a TV and a remote controller, an operation method of the image processing device, and a computer-readable recording medium.

Technical Solution

According to an aspect of the present disclosure, an image processing device includes a speech acquirer configured to acquire a speech of a user and provide a first speech signal; a communication interface configured to obtain a second speech signal of the user from an external device; and a processor configured to, when the first speech signal is obtained from the speech acquirer, perform a first preprocessing operation using speech amplification of the first speech signal and when the second speech signal is obtained through the communication interface, perform a second preprocessing operation using noise amplification of the second speech signal.

The first speech acquirer may include a plurality of microphones arranged left and right on the image processing device when viewed by the user, and the external device may include a plurality of microphones arranged before and after or up and down when the user views the external device.

The communication interface may be configured to obtain the second speech signal in which speech signals provided by the plurality of microphones are mixed in a stereo form, from the external device via a single channel.

The image processing device may further include a connector configured to connect and disconnect the speech acquirer.

The processor may be configured to perform a speech amplification operation and a speech attenuation operation on the provided first speech signal, and perform the first preprocessing operation by using the first speech signal on which speech amplification is performed as a primary signal and the first speech signal on which speech attenuation is performed as an interference signal.

The processor may be configured to perform a noise amplification operation and a noise attenuation operation on the obtained second speech signal, and perform the second preprocessing operation by using the second speech signal on which noise attenuation is performed as the primary signal and the second speech signal on which noise amplification is performed as the interference signal.

The processor may be configured to provide a first target speech signal extracted by the first preprocessing operation and a second target speech signal extracted by the second preprocessing operation to a speech recognizer configured to perform a speech recognition operation.

When there is a user command for performing a near field speech recognition operation using the external device, the processor may be configured to obtain the second speech signal through the communication interface.

The user command may be input by a user and the image processing device or an interface of the external device.

According to another aspect of the present disclosure, an operation method of an image processing device may include acquiring a speech of a user and provide a first speech signal; obtaining a second speech signal of the user from an external device; and when the first speech signal is provided, performing a first preprocessing operation using speech amplification of the provided first speech signal and when the second speech signal is obtained from the external device, performing a second preprocessing operation using noise amplification of the second speech signal.

The first speech signal may be provided by a plurality of microphones arranged left and right on the image processing device when viewed by the user, and wherein the obtaining includes: obtaining the second speech signal provided by a plurality of microphones arranged before and after or up and down when the user views the external device.

The obtaining may include obtaining the second speech signal in which speech signals provided by the plurality of microphones are mixed in a stereo form, from the external device via a single channel.

The operation method may further include, when a speech acquirer including the plurality of microphones is connected to a connector of the image processing device, recognizing the speech acquirer.

The performing of the first preprocessing operation may include performing a speech amplification operation and a speech attenuation operation on the provided first speech signal, and performing the first preprocessing operation by using the first speech signal on which speech amplification is performed as a primary signal and the first speech signal on which speech attenuation is performed as an interference signal.

The performing of the second preprocessing operation may include performing a noise amplification operation and a noise attenuation operation on the obtained second speech signal, and performing the second preprocessing operation by using the second speech signal on which noise attenuation is performed as the primary signal and the second speech signal on which noise amplification is performed as the interference signal.

The operation method may further include providing a first target speech signal extracted by the first preprocessing operation and a second target speech signal extracted by the second preprocessing operation to a speech recognizer configured to perform a speech recognition operation.

The obtaining may include, when there is a user command for performing a near field speech recognition operation using the electronic device, obtaining the second speech signal through the communication interface.

The user command may be input by a user and the image processing device or an interface of the electronic device.

According to another aspect of the present disclosure, a computer-readable recording medium includes a program for executing an operation method of an image processing device, wherein the operation method includes: acquiring a speech of a user and providing a first speech signal; obtaining a second speech signal of the user from an external device; and when the first speech signal is provided, performing a first preprocessing operation using speech amplification of the provided first speech signal and when the second speech signal is obtained from the external device, performing a second preprocessing operation using noise amplification of the second speech signal.

BEST MODE

Hereinafter, exemplary embodiments of the present disclosure will be described in more detail with reference to the accompanying drawings.

Although exemplary embodiments of the present disclosure will be described on the assumption that, for example, a spontaneous speech engine is provided in a server for the convenience of description, since exemplary embodiments of the present disclosure is applicable to a case in which a stationary speech engine is provided in a TV, a set-top box, or a peripheral device thereof (e.g., an access point), etc., the present disclosure is not limited to any method.

Figure 1:
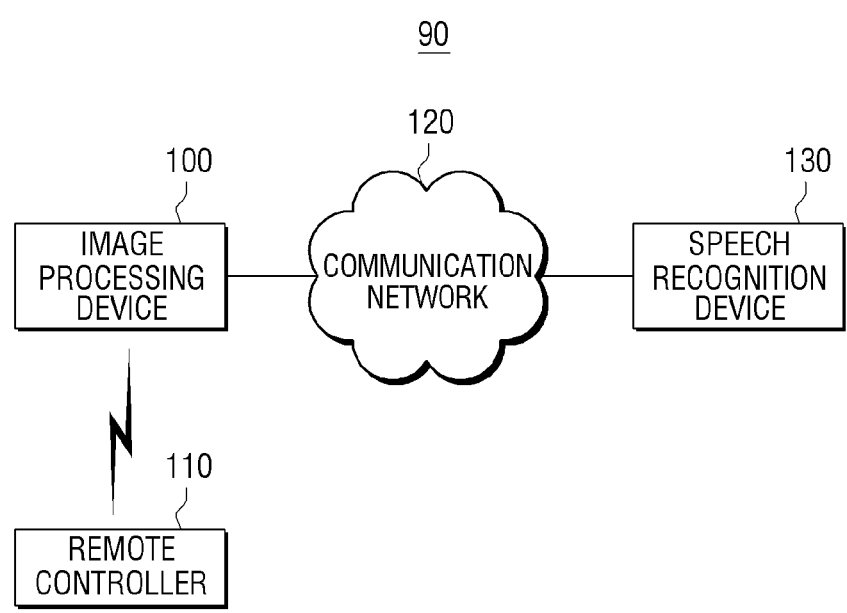
FIG. 1 is a diagram of a speech recognition system according to an exemplary embodiment of the present disclosure.

FIG. 1 is a diagram of a speech recognition system according to an exemplary embodiment of the present disclosure.

As shown in FIG. 1, a speech recognition system 90 according to an exemplary embodiment of the present disclosure includes some or all of an image processing device 100, a remote controller 110, a communication network 120 and a speech recognition device 130.

Here, "including some or all" means that the system 90 is configured by omitting some components such as the communication network 120 and/or the speech recognition device 130, or may be configured by integrating a speech recognition engine (e.g., a spontaneous speech engine) of a configuration such as the speech recognition device 130 with other components, etc. and is described as including all of them in order to facilitate a sufficient understanding of the disclosure.

The image processing device 100 includes an image display device such as a DTV and a peripheral device such as a set-top box connected to the DTV, etc. The peripheral device corresponds to another electronic device of the image processing device 100, and may further include a BD (Blu-ray Disk) player, an access point, a refrigerator, etc. in addition to the set-top box. The image processing device 100 may further include a mobile phone such as a smart phone. The mobile phone may perform various functions such as display, (data) relay, remote control, etc. and thus will be appropriately used according to a selection thereof.

The image processing device 100 according to an exemplary embodiment of the present disclosure may include a plurality of microphones (hereinafter referred to as mics). In the present disclosure, the plurality of mics (or first mics) may be referred to as a mic array. An array means an arrangement. The plurality of mics may be provided in the image processing device 100 in various forms, for example, may be formed by being mounted on the inside or may be provided by being connected to a connector of the image processing device 100 from the outside. Here, the form mounted on the inside may have, for example, a form of arranging a plurality of chips on a printed circuit board (PCB).

The plurality of mics may have a linear shape arranged in a first direction. The plurality of mics having the linear shape may be arranged in a horizontal direction in order to maximize the best performance when a speaker is positioned on the front side (e.g., a screen side of the TV) of the image processing device 100. The horizontal direction may be named as a broadside direction. The plurality of mics may have the same form as the remote controller 110, but may have various forms such as a circular shape if it may have other types of mic arrangements. In the present disclosure, distances between the mics will not be described in detail, but such a part may also be considered. The form of the plurality of mics of the image processing device 100 and the remote controller 110 may be finally identified in consideration of the manufacturing cost or speech recognition performance according to the installation of the mics, and thus the present disclosure is not particularly limited to any method.

According to the above configuration, for example, when the TV is powered on and turned on, the image processing device 100 may operate the mic array provided therein. For example, the image processing device 100 may maintain the mics turned on at all times or some of the mics turned on to recognize a speaker's speech, such as a trigger "Hi TV". Therefore, the image processing device 100 uses a speech input to the image processing device 100 by default unless there is a user command to use the speech input from the remote controller 110. Therefore, as shown in FIG. 1, the image processing device 100 performs an operation for recognizing a user's speech uttered at a far field rather than the remote controller 110 with respect to a position of the speaker.

Also, when the image processing device 100 needs to perform a near field speech recognition operation using the remote controller 110 based on a user command input on a button or a touch screen provided in the image processing device 100 or a user command input from the remote controller 110, the image processing device 100 may stop an internal mic operation. Accordingly, the image processing device 100 may also perform the near field speech recognition operation simply by adding a converter to a program for performing a far field speech recognition operation using an internal mic.

In other words, if the image processing device 100 has provided a primary signal and an interference signal by performing signal processing (e.g., speech amplification, speech suppression, etc.) on a plurality of speech signals input to the internal mic in order to perform far field speech recognition, in order to perform good preprocessing on the above signals, for example, in one algorithm, by performing signal processing such as noise amplification and noise suppression on the plurality of speech signals in the near field speech recognition operation, since the image processing device 100 needs to change positions of the plurality of noise amplified speech signals and positions of the plurality of noise suppressed speech signals to each other and input the signals to, for example, a post-filter, in an exemplary embodiment of the present embodiment, a converter (e.g., a mode selector) for changing positions of input signals and outputting the signals in a specific situation is used. The converter may correspond to a software module. This process may be based on the fact that an object of beam forming for far field speech recognition is speech rather than noise, but an object of beam forming for near field speech recognition is noise.

The remote controller 110 refers to a conventional remote control, but may include a mobile phone having a remote control function or the like. The remote controller 110 also has a plurality of mics (or second mics). Such a plurality of mics may be arranged in the same direction as the image processing device 100 but may be arranged in a direction, for example, a vertical direction, different from the first direction in terms of a structure characteristic (e.g., speech acquisition performance improvement, etc.) of the remote controller 110. Here, the "vertical direction" means a manner that the plurality of mics is disposed in the remote controller 110 to be positioned before and after when the speaker views the remote controller 110. In an exemplary embodiment of the present disclosure, the plurality of mics may be disposed above and below a front portion of the remote controller 110 where signals are transmitted and obtained.

According to this structure, when the image processing device 100 executes one algorithm, since the plurality of mics included in the remote controller 110 have a form different from the mic arrangement of the image processing device 100, the preprocessing operation must be performed differently through the converter as above such that signal processing may be performed normally. If the plurality of mics included in the remote controller 110 has the same form as the image processing device 100, the image processing device 100 may be configured by omitting the above converter.

Further, when the user desires to perform the near field speech recognition operation, the remote controller 110 may transmit a control signal to the image processing device 100 to inform this. If a user command for the near field speech recognition operation is obtained from the image processing device 100 to the remote controller 110, may be the opposite. Thus, it may not be particularly limited from which the user command is input. As long as the image processing device 100 recognizes that there is a user command, it may be irrelevant in what form the user command is processed.

The communication network 120 includes both wired and wireless communication networks. Here, the wired network includes an Internet network such as a cable network or a public switched telephone network (PSTN), and the wireless communication network includes a CDMA, WCDMA, GSM, Evolved Packet Core (EPC), Long Term Evolution (LTE), Wibro network, etc. The communication network 120 according to an exemplary embodiment of the present disclosure is not limited thereto, and may be used in, for example, a cloud computing network under a cloud computing environment as an access network of a next generation mobile communication system to be realized in the future. For example, when the communication network 120 is the wired communication network, an access point in the communication network 120 may access a switching center of a telephone office or the like, whereas, when the communication network 120 is the wireless communication network, the access point may access an SGSN or a Gateway GPRS Support Node (GGSN) administered by a communication provider to process data or access various relay devices such as Base Station Transmission (BTS), NodeB, e-NodeB, etc. to process the data.

The communication network 120 may include the access point. The access point includes a small base station such as a femto or pico base station which is installed in a large number of buildings. Here, the femto or pico base station is classified according to the maximum number of the image processing devices 100 connectable thereto in terms of the classification of the small base station. The access point includes a near field communication module for performing near field communication such as ZigBee and Wi-Fi with the video processing apparatus 100. The access point may use TCP/IP or RTSP (Real-Time Streaming Protocol) for wireless communication. Here, near field communication may be performed in various standards such as Bluetooth, Zigbee, IrDA, RF (Radio Frequency) such as UHF (Ultra High Frequency) and VHF (Very High Frequency), UWB (Ultra Wide Band), etc. in addition to WiFi. Accordingly, the access point may extract a location of a data packet, designate the best communication path with respect to the extracted location, and transfer the data packet along the designated communication path to a next device, e.g., the image processing device 100. The access point may share a plurality of lines in a general network environment, and may include, for example, a router, a repeater, and a relay device.

The speech recognition device 130 includes a speech recognition server and may operate as a kind of cloud server. In other words, the speech recognition device 130 includes all (or some) of HW resources or SW resources related to speech recognition, thereby generating and providing a recognition result (e.g., text based) of the uttered speech obtained from the image processing device 100 having the minimum resources. The speech recognition device 130 according to an exemplary embodiment of the present disclosure is not limited to the cloud server. For example, when the communication network 120 is omitted and the image processing device 100 performs direct communication with the speech recognition device 130, the speech recognition device 130 may be an external device, that is, an access point, or a peripheral device such as a desktop computer. Alternatively, the speech recognition device 130 may be any type of device as long as it may provide only the recognition result of a speech signal provided by the image processing device 100, more precisely, audio data. In this regard, the speech recognition device 130 may be a recognition result providing device.

The speech recognition device 130 according to an exemplary embodiment of the present disclosure may identify a recognition result of audio data when obtaining the audio data of the speech uttered by the user from the image processing device 100. If the user requests a search by uttering a name of a sports star, the speech recognition device 130 may provide a search result to the image processing device 100 based on a recognition result of uttered speech corresponding to a search word. On the other hand, if the user utters speech for operating hardware (e.g., a tuner) or software (e.g., an application) of the image processing device 100, the speech recognition device 130 will provide a recognition result of the speech.

Figure 2:
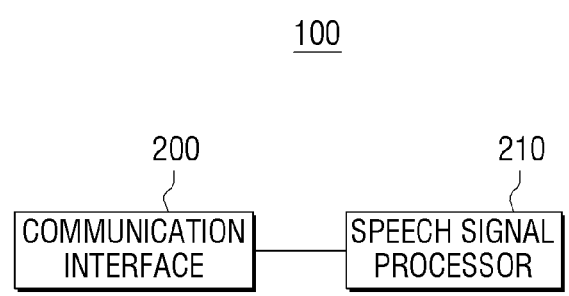
FIG. 2 is a block diagram showing a detailed structure of an image processing device of FIG. 1 according to a first exemplary embodiment of the present disclosure.
Figure 3:
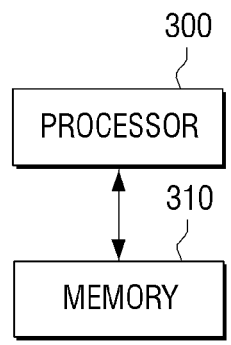
FIG. 3 is an example view showing a detailed structure of a speech signal processor shown in FIG. 2.

FIG. 2 is a block diagram showing a detailed structure of an image processing device of FIG. 1 according to a first exemplary embodiment of the present disclosure, and FIG. 3 is an example view showing a detailed structure of a speech signal processor shown in FIG. 2.

As shown in FIG. 2, if the image processing device 100 of FIG. 1 according to the first exemplary embodiment of the present disclosure is a peripheral device such as a set top box, and a mic is connected from the outside, the image processing device 100 may include a communication interface 200 and a speech signal processor 210, and, if the mic is not connected from the outside, the image processing device 100 may further include a speech acquirer such as a mic array.

When the image processing device 100 operates in a far field speech recognition mode, the communication interface 200 may transmit a plurality of speech signals obtained from a mic connected to the communication interface 200 to the speech signal processor 210. Also, when the image processing device 100 operates in a near field speech recognition mode, the communication interface 200 obtains a plurality of speech signals provided from the remote controller 110 and transmits the speech signals to the speech signal processor 210. Here, a mode corresponds to a state in which a system designer designates a device to operate in a certain process under a certain condition.

Further, the communication interface 200 may process various types of information, that is, data, according to in what form a speech signal is processed by the speech signal processor 210. For example, suppose that the speech signal processor 210 includes a stationary speech engine. In this case, the communication interface 200 may process various operations of the image processing device 100 based on a recognition result. For example, suppose that "turn off the TV". Based on a recognition result of this, the image processing device 100 may block a power source input from the outside.

Also, suppose that the communication interface 200 needs to operate in conjunction with the speech recognition device 130 of FIG. 1. If the speech signal processor 210 identifies that it is impossible to process a trigger command by itself, the speech signal processor 210 may perform a simple preprocessing operation and control the communication interface 200 to transmit a preprocessed speech signal to the speech recognition device 130.

Although the speech signal processor 210 may perform various operations as described above, the speech signal processor 210 performs both the far field speech recognition operation and the near field speech recognition operation according to an exemplary embodiment of the present disclosure. The speech signal processor 210 performs a preprocessing operation prior to performing a recognition operation. When a speech signal is input, the speech signal processor 210 detects only a section in which a trigger signal is present, and basically performs an operation of removing noise from the extracted speech signal section, etc. At this time, the speech signal processor 210 amplifies a speech region through a beam forming operation (e.g., amplification of an amplifier) in the far field speech recognition operation, suppresses the speech region through an attenuator (e.g., a blocking matrix), (post)processes two signals again, for example, the post-filter to extract a wanted target speech signal.

Also, when the speech signal processor 210 operates in a near field speech recognition mode according to the present disclosure, the speech signal processor 210 uses the same, for example, beam former and blocking matrix as above to amplify and suppress each noise region, and then changes positions of the two signals input to a postprocessing end (e.g. the post-filter) that outputs the target speech signal and inputs the signals. In other words, this is because that amplifying the noise region may be regarded as maintaining a speech region but contrasting with suppressing the above speech region, and reducing the noise region may be regarded as contrasting with amplifying the speech region. This may be regarded as being resulted from an arrangement direction of the mics provided in the image processing device 100 and the remote controller 110 of FIG. 1, and thus in the present invention, in order to perform different preprocessing operations based on the arrangement direction of the mics, the two signals are input to the postprocessing end by changing the positions of the two signals through the converter.

If the arrangement directions of the mics included in the image processing device 100 and the remote controller 110 are the same, although the above position conversion process may be unnecessary, efficiency of speech recognition, in particular, near field speech recognition, may be instead reduced. Therefore, in the present disclosure, assuming that the mics are arranged in consideration of this situation, it may be seen that the image processing device 100 performs the far and near field speech recognition operations only by merely adding the converter and achieves the best efficiency.

Meanwhile, the speech signal processor 210 may include a processor 300 and a memory 310 as shown in FIG. 3. The processor 300 may execute a program (or algorithm) according to an exemplary embodiment of the present disclosure stored in the memory 310 to perform the speech processing operations according to the present disclosure. Here, the processor 300 may include, for example, a command analyzer, an ALU, a register group, and a control circuit. This is well known to those skilled in the art, and thus detailed descriptions thereof are omitted.

Figure 4:
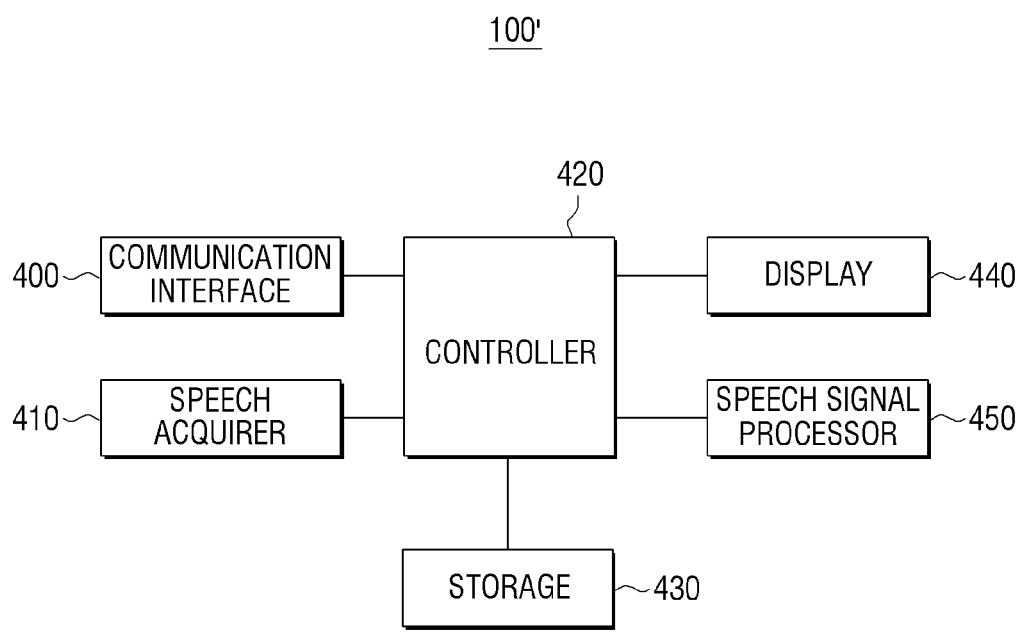
FIG. 4 is a block diagram showing a detailed structure of an image processing device of FIG. 1 according to a second exemplary embodiment of the present disclosure.

FIG. 4 is a block diagram showing a detailed structure of an image processing device of FIG. 1 according to a second exemplary embodiment of the present disclosure.

As shown in FIG. 4, it is assumed that the image processing device 100 of FIG. 1 according to the second exemplary embodiment of the present disclosure is an image display device such as a DTV and a mic is embedded. The image processing device 100 includes all or some of a communication interface 400, a speech acquirer 410, a controller 420, a storage 430, a display 440, and a speech signal processor 450.

Here, "including some or all" means that some components are omitted or one component may be integrated with another component, and is described as including all of them in order to facilitate a sufficient understanding of the disclosure.

An image processing device 100' of FIG. 4 is not significantly different from the image processing device 100 of FIG. 2 and differs in that the image processing device 100' of FIG. 4 includes a speech acquirer 410 and the controller 420 and the speech signal processor 450 are physically separated from each other. Accordingly, a control function is performed by the controller 420, and speech signal processing is performed by the speech signal processor 450.

The speech acquirer 410 may include a plurality of mics according to an exemplary embodiment of the present disclosure. At this time, the plurality of mics may have a linearly arranged shape, and may be arranged, for example, in a broadside direction, that is, a direction (→) perpendicular to a direction (↑) in which a speaker views. Also, the speech acquirer 410 may be possible in the form of a chip configured on a board, and it will be irrelevant in any form as long as it may have a different form from the remote controller 110 of FIG. 1 in an exemplary embodiment of the present disclosure.

Also, when processing of a speech signal is necessary, the controller 420 may control the speech signal processor 450 to execute the program stored therein, obtain a result according to the execution and process the speech signal. For example, the controller 420 may obtain a recognition result of a command "what time is it?" through the speech signal processor 450 and accordingly allow the display 440 to display related information.

The speech signal processor 450, although already described with reference to FIG. 2, may be configured in the form of an EEPROM to update a method of writing a program for speech signal processing.

Meanwhile, when the controller 420 includes the processor 300 and the memory 310 as shown in FIG. 3, the processor 300 may load and use the program stored in the speech signal processor 450 onto the memory 310 upon initial driving of the image processing device 100'. Accordingly, the memory 310 may be a RAM.

The storage 430 may store various information or data internally processed by the speech processing apparatus 100'. Here, the information indicates identification information of a device, user information, etc., whereas the data may mean speech and image data. The information or data stored in the storage 430 may be output under the control of the controller 420.

Figure 5:
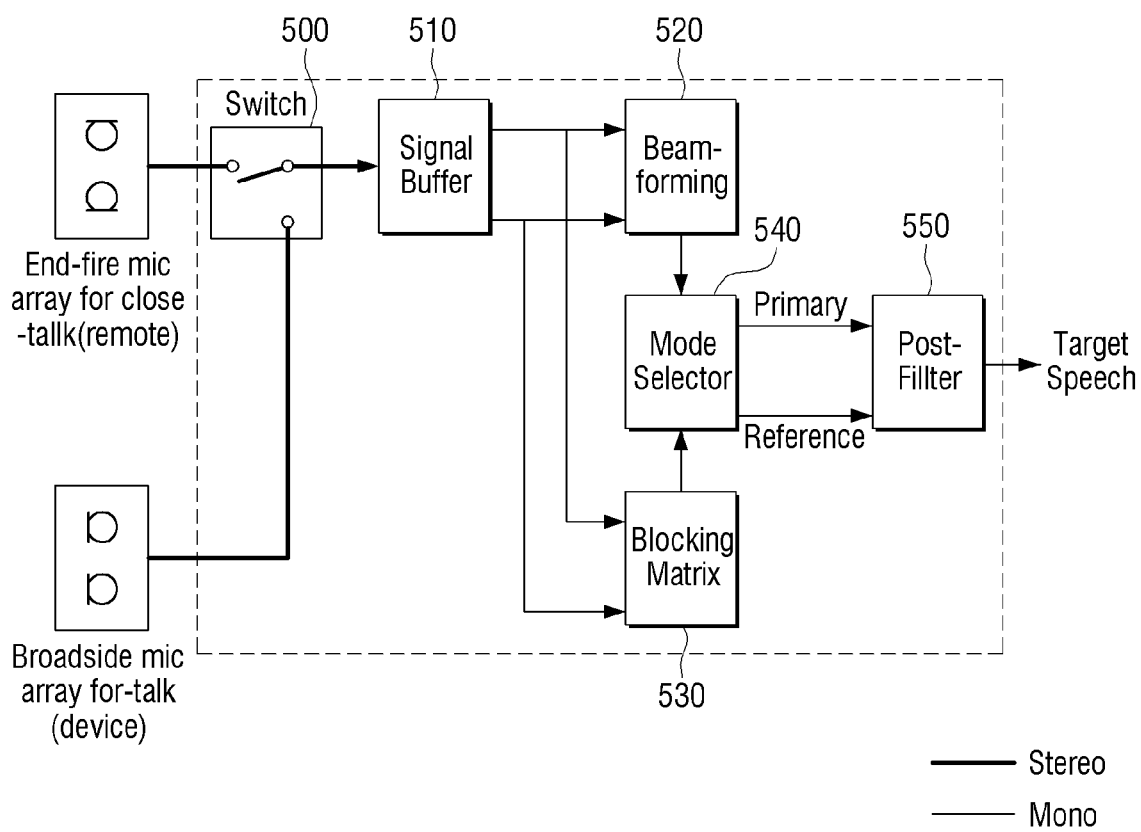
FIG. 5 is a block diagram illustrating a detailed structure of a speech signal processor shown in FIGS. 2 and 4.
Figure 6:
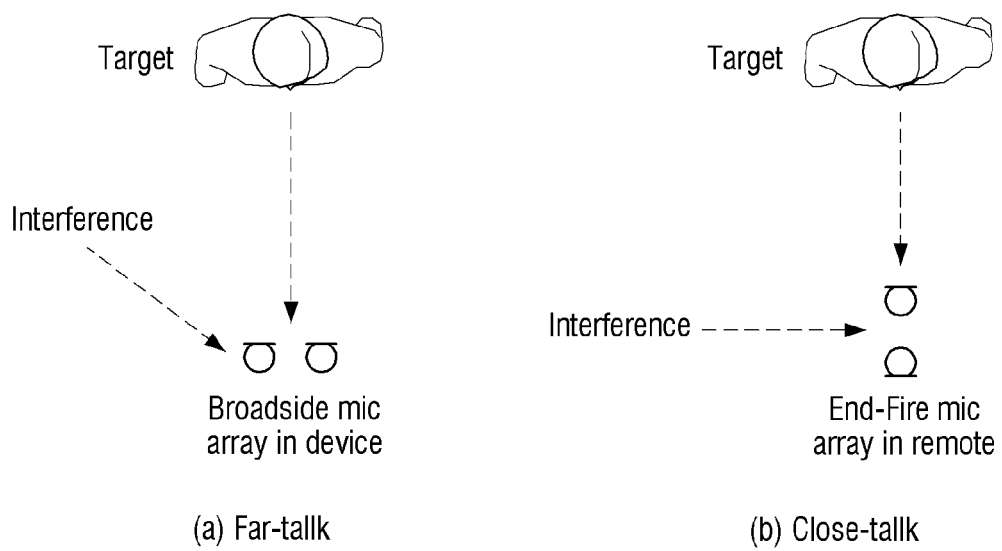
FIG. 6 is a diagram for explaining a far field speech recognition environment and a near field speech recognition environment.

FIG. 5 is a block diagram illustrating a detailed structure of a speech signal processor shown in FIGS. 2 and 4, and FIG. 6 is a diagram for explaining a far field speech recognition environment and a near field speech recognition environment.

As shown in FIG. 5, for example, the speech signal processor 450 of FIG. 4 includes some or all of a switcher 500, a buffer 510, a beam former 520, a blocking matrix 530, a converter 540, and a postprocessor 550.

Here, "including some or all" is the same as the above meaning, and each of the above blocks may mean classification in a hardware manner, but it may mean a software module for performing each function in single software. A module in hardware may be a single chip unit.

The switcher 500 includes a switch. The switch may be composed of MOSFET elements. The switcher 500 selects a speech signal (or a first speech signal) from the image processing apparatus 100 of FIG. 1 and a speech signal (or a second speech signal) of the remote controller 110. For example, in the case where a TV is turned on, the switch 500 may be set as default to obtain the speech signal from the image processing device 100, and when changed to a near field speech recognition mode using the remote controller 110, may select a path to obtain the speech signal of the remote controller 110. At this time, for example, control may be performed under the control of the controller 420 of FIG. 4. Here, the change to the near field speech recognition mode may be performed by selecting a speech recognition button provided in the remote controller 110.

The buffer 510 may temporarily store, synchronize, and output a signal input from the outside. For example, a signal or data is obtained in serial and converted into a parallel form. Accordingly, the buffer 510 may simultaneously output signals to the beam former 520 and the blocking matrix 530.

The beam former 520, together with the blocking matrix 530 and the converter 540, performs a preprocessing operation of the speech signal according to the present disclosure. In fact, in the speech recognition operation, a preprocessor means including the above postprocessor, but in the present disclosure, the preprocessor is again divided into the preprocessor and the postprocessor for convenience. The beam former 520 amplifies the signal input in a speaker direction, and may thus include an amplifier.

On the other hand, the beam former 520 uses the same algorithm as above when the speech signal is input in a near field speech recognition environment, and accordingly a noise region in the obtained speech signal is amplified. Therefore, one beam former 520 performs the same operation due to different types of mics disposed in the image processing device 100 and the remote controller 110, while amplifying a speech region in one aspect, and amplifying the noise region in another aspect.

The blocking matrix 530 attenuates the signal input in the speaker direction. For example, if the beam former 520 amplifies the speech region, the blocking matrix portion 530 attenuates the speech region. In fact, the speech signal includes a speech region representing a user uttered speech and a noise region which is a noise signal. At this time, the speech signal having the amplified speech region input to the converter 540 through the beam former 520 is a primary signal, and the speech signal having the attenuated speech region input from the blocking matrix 530 is an interference signal.

As described above, when the speech signal is input in the near field speech recognition environment, the blocking matrix 530 provides the speech signal having the attenuated speech region to the converter 540 through the same algorithm as above.

The converter 540 provides the primary signal and the interference signal to the postprocessor 550 when performing a far field speech recognition operation such that the postprocessor 550 may analyze a noise characteristic and output a wanted target speech signal according to a result of analysis. In order to perform a near field recognition operation, converter 540 provides the speech signal having the attenuated speech region to an input unit to which the above primary signal is provided and provides the speech signal having the amplified noise region to an input unit to which the above interference signal is provided such that the postprocessor 550 may output a wanted target speech signal. This is referred to as a 'mode change' in an exemplary embodiment of the present disclosure. In other words, the converter 540 performs signal processing in a first method in a first situation and processes a signal in a second method different from the first method in a second situation, and thus it may be referred to as the mode change.

Although the postprocessor 550 (e.g., the post-filter) is, strictly speaking, included in the preprocessing operation in the speech recognition operation, the postprocessor 550 outputs the target speech signal required for speech recognition using the primary signal and the interference signal input in the far field speech recognition environment and the near field speech recognition environment. The post-filter will be described in more detail later.

The output target speech signal is provided to a speech recognizer, and the speech recognition operation will be performed. The speech recognizer may extract a characteristic of the target speech signal and compare the target speech signal with data of a speech model DB based on the extracted characteristic to identify a recognition result.

In more detail, a two-channel mic array embedded in a main body of the image processing device 100 for controlling the device through far field speech recognition is arranged perpendicular to a front direction of a product as shown in FIG. 6(a), which is called a broadside array. When beam forming is applied to such a mic array signal in the front direction, a speech of a speaker may be amplified and a signal having an attenuated sound in a lateral direction may be obtained. This is called a primary signal.

Also, it is possible to provide a filter for enhancing sound in a specific direction by applying an adaptive filtering technique based on Independent Component Analysis (ICA). As in Geometric Source Separation (GSS), if a beam forming filter coefficient fixed to the speaker direction is utilized as an adaptation constraint, a signal having a suppressed speaker speech may be obtained. This is called an interference signal and a module that provides such a filter is called a blocking matrix.

In other words, the primary signal under a far-talk condition is a signal in which a speaker's speech in the front is emphasized and an interference noise in the side is suppressed, whereas the interference signal is a signal in which the speaker's speech in the front is suppressed and the interference noise in the side is emphasized. The goal is to eliminate ambient noise and interference noise included in the primary signal. In general, it is assumed that the ambient noise has a fixed characteristic and the interference noise has a dynamic characteristic. Therefore, a noise estimation method such as Minima-Controlled Recursive Average (MCRA) estimates the ambient noise and adds the interference signal thereto to estimate a non-speech noise included in the primary signal. Finally, based on the estimated noise, a speech estimation technique such as Optimally Modified Log Spectral Amplitude (OM-LSA) is applied to extract the speaker speech from the primary signal. Such a processing process is wholly performed by the postprocessor 550. At this time, the postprocessor 550 may perform a separate operation in order to drastically reduce an amount of computation.

A two-channel end-fire mic array, which is applied to a remote controller, i.e., the remote controller 110, to often eliminate a side interference noise, is mounted on the front/rear of the remote controller as shown in FIG. 6(b) and has a linear arrangement in the speaker direction. In this case, when the converter 540 for the mode change is not applied as in an exemplary embodiment of the present disclosure, an output signal of a beam former is a signal in which the side interference noise is enhanced and the speaker speech is suppressed, whereas an output signal of the blocking matrix 530 is a signal in which the speaker speech is enhanced. Therefore, a signal processing structure (e.g.: a beam former, a blocking matrix) for far field speech recognition mentioned above is applied as it is, while if signals provided from the converter 540 to the postprocessor 550, i.e., the primary signal and the interference signal, are switched and input, a signal in which the side interference noise and the ambient noise are effectively removed may be obtained. That is, even when the image processing apparatus 100 of FIG. 1 operates in the near field speech recognition mode, the wanted target speech signal may be easily obtained.

Figure 7:
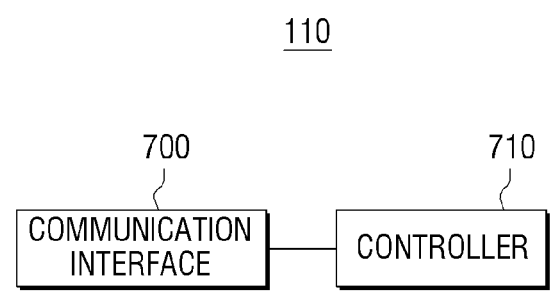
FIG. 7 is a block diagram showing a detailed structure of a remote controller of FIG. 1 according to the first exemplary embodiment of the present disclosure.

FIG. 7 is a block diagram showing a detailed structure of a remote controller of FIG. 1 according to the first exemplary embodiment of the present disclosure.

As shown in FIG. 7, the remote controller 110 according to the first exemplary embodiment of the present disclosure includes a communication interface 700 and a controller 710, and may further include a speech acquirer.

For example, (1) a case where a plurality of mics are connected to the communication interface 700 of the remote controller 110 and operate, (2) a case where the remote controller 110 receives a user command for a near field speech recognition operation through speech recognition and transmits the received user command to the image processing device 100 of FIG. 1, and (3) a case where the remote controller 110 performs the near field speech recognition operation based on the user command provided by the image processing device 100, etc. may have a structure of FIG. 7.

In consideration of various situations as described above, the communication interface 700 performs various operations for near field speech recognition under the control of the controller 710. For example, when there is the user command for performing the near field speech recognition operation, a plurality of signals obtained through the plurality of mics are formed in a stereo form, and a speech signal of the formed stereo form is transmitted to the image processing device 100 through a single channel.

The controller 710 may control the communication interface 700 to provide the signals input through the plurality of mics in the stereo form and transmit the signals to the image processing device 100 according to an exemplary embodiment of the present disclosure. This may be done when there is the user command for performing the near field speech recognition operation, and if there is a release command, the controller 710 may perform an operation, such as, of blocking power supplied to the plurality of mics.

Figure 8:
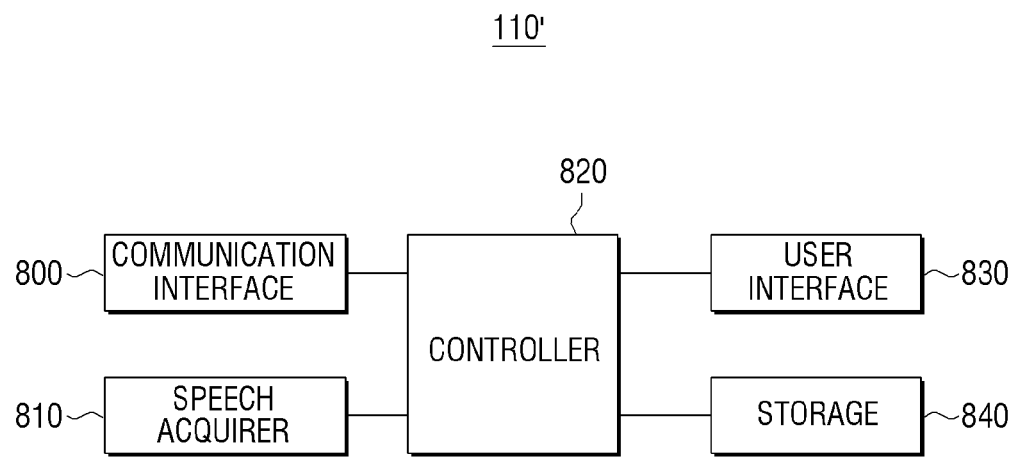
FIG. 8 is a block diagram showing a detailed structure of a remote controller of FIG. 1 according to the second exemplary embodiment of the present disclosure.

FIG. 8 is a block diagram showing a detailed structure of a remote controller of FIG. 1 according to the second exemplary embodiment of the present disclosure.

As shown in FIG. 8, a remote controller 110' according to the second exemplary embodiment of the present disclosure includes some or all of a communication interface 800, a speech acquirer 810, a controller 820, a user interface 830, and a storage 840. Here, "including some or all" is the same as the above meaning.

Compared with the remote controller 110 of FIG. 7, the remote controller 110' of FIG. 8 differs in that the remote controller 110' includes the speech acquirer 810 in which a plurality of mics are arranged, and further includes the use interface 830 such as a button or a display. A mic arrangement of the speech acquirer 810 may have a different form from that of mics arranged in the image processing device 100 of FIG. 1. Also, when a user desires to perform a near field speech recognition operation using the remote controller 110', although the remote controller 110' may use physical buttons provided on the front or side of a main body to perform the operation, when implemented in the form of a keypad on a screen of the display, the user may touch and use the keypad displayed on the screen.

Also, the controller 820 may control all components of the remote controller 110'. For example, the controller 820 may store processed information or data in the storage 840 and then use the information or the data. According to an exemplary embodiment of the present disclosure, if the user has requested to perform the near field speech recognition operation through the user interface 830, the controller 820 provides this to the image processing device 100 through the communication interface 800. Information provided at this time may be bit information. Also, the controller 820 may perform the near field speech recognition operation to combine speech signals input through a plurality of mics of the speech acquirer 810 to provide a speech signal of a stereo form. The controller 820 may transmit the provided speech signal to the image processing device 100 through the communication interface 800.

Except for this, the communication interface 800, the speech acquirer 810, the controller 820, the user interface 830, and the storage 840 shown in FIG. 8 are not greatly different from the communication interface 700 and the controller 710 of FIG. 7, and thus descriptions thereof are replaced with their descriptions.

Meanwhile, as in the case of FIG. 7, the controller 820 of FIG. 8 may have the same structure as shown in FIG. 3. Therefore, in the present disclosure, a form of the remote controller 110' will not be particularly limited.

Figure 9:
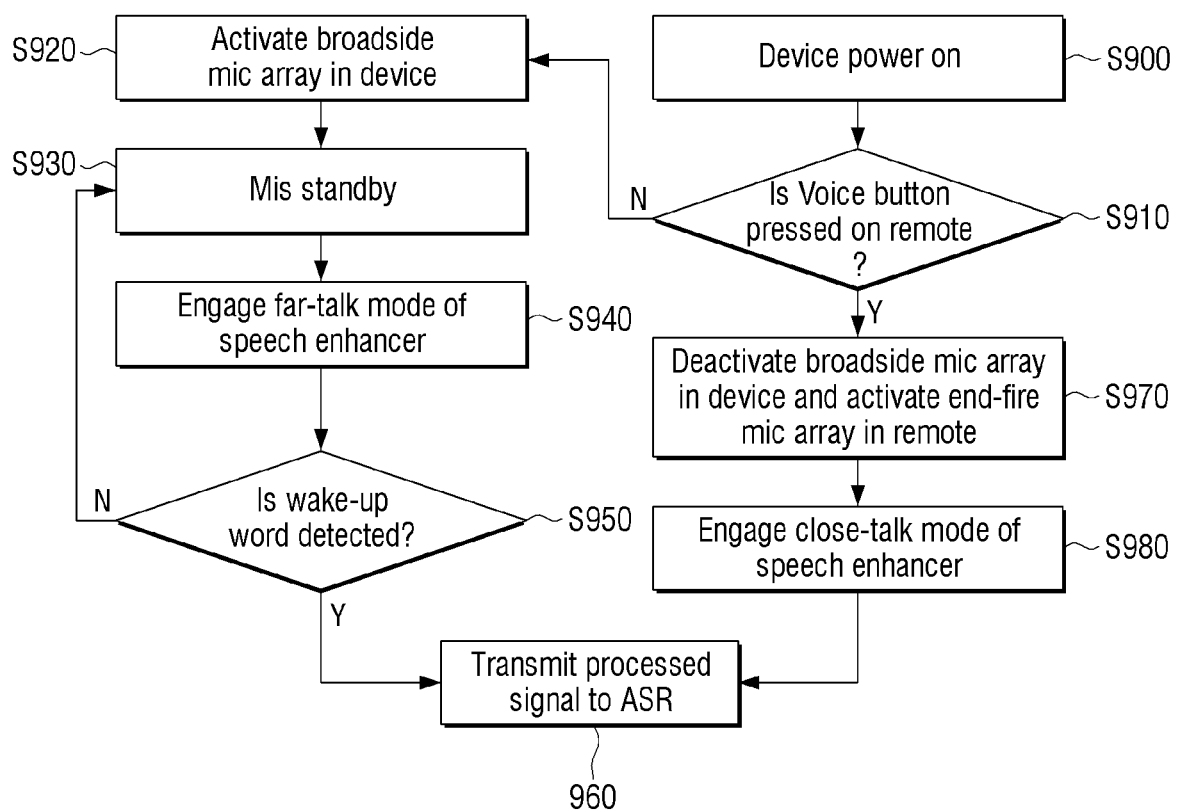
FIG. 9 is a flowchart illustrating an operation process of an image processing device according to the first exemplary embodiment of the present disclosure.

FIG. 9 is a flowchart illustrating an operation process of an image processing device according to the first exemplary embodiment of the present disclosure.

For convenience of description, referring to FIG. 9 together with FIGS. 1 and 5, a mic embedded in the image processing device 100 is activated at the same time when power is turned on, a processing mode of preprocessing is a far field mode as default, and the image processing device 100 inputs an output of the beam former 520 as a primary signal and a blocking matrix output as an interference signal to the postprocessor 550 (S900 to S940). If it is identified that an output signal of the postprocessor 550 is a wake-up word for activating a speech recognition mode, a subsequent output signal is sent to a speech recognizer for recognizing an additional command (S950, S960).

When a user presses a speech recognition button of a remote controller, the mic embedded in the image processing device 100 is deactivated and at the same time a mic embedded in the remote controller is activated, the processing mode is changed to a near field mode, and the image processing device 100 inputs the blocking matrix output as the primary signal and the output of the beam former 520 as the interference signal to the postprocessor 550 (S910 to S980). Then, the output signal of the postprocessor 550 is sent to the speech recognizer. Here, "change to the near field mode" means that the converter (or a mode selector) 520 outputs two input signals with their positions reversed.

Figure 10:
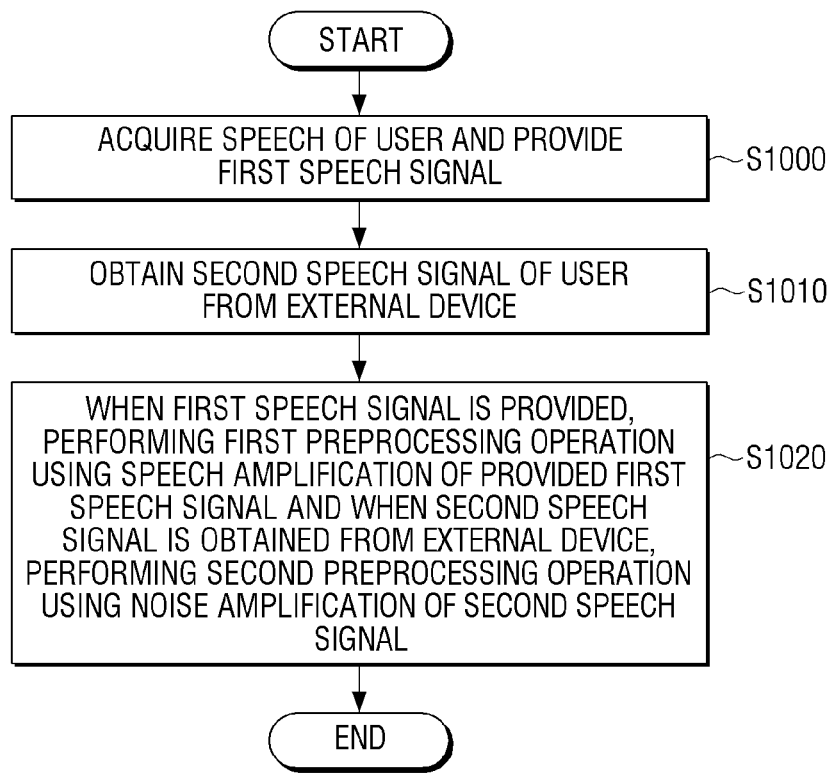
FIG. 10 is a flowchart illustrating an operation process of an image processing device according to the second exemplary embodiment of the present disclosure.

FIG. 10 is a flowchart illustrating an operation process of an image processing device according to the second exemplary embodiment of the present disclosure.

For convenience of description, referring to FIG. 10 together with FIG. 1, the image processing device 100 of FIG. 1 acquires a user's speech and provides a first speech signal (S1000). For example, the image processing device 100 provides a plurality of first speech signals through a first speech acquirer including a plurality of microphones arranged in a first form in its own main body. Here, the plurality of first speech signals represent a plurality of first speech signals provided through the respective microphones. Each speech signal will include noise, i.e., noise.

Also, the image processing device 100 obtains a second speech signal of a user from an external device (S1010). Here, the second speech signal represents a signal provided by a second speech acquirer provided in the external device. The second speech acquirer includes a plurality of microphones arranged in a second form different from the first form, and the image processing device 100 obtains a plurality of second speech signals provided by the plurality of microphones from another electronic device, for example, the remote controller 110. The second speech signal will also include noise.

Then, the image processing device 100 performs a first preprocessing operation using speech amplification of the first speech signal when the first speech signal is provided, and performs a second preprocessing operation using noise amplification of the second speech signal when the second speech signal is obtained from the external device (S1020). Here, first preprocessing may process a signal by default for a far field speech recognition operation, for example, without a mode change, and second preprocessing may process the signal by changing modes for a speech recognition operation.

As described above, even if one beam former and one blocking matrix are used, since types of signals obtained by different mic arrays are different, the image processing device 100 may not perform the far and near field speech recognition operations smoothly. Therefore, in an exemplary embodiment of the present disclosure, some operations are regarded as having been added such that signal processing is performed on the second speech signal obtained in the near field speech recognition mode in the same (or similar) processing method as the first speech signal obtained in the far field speech recognition mode, which may correspond to a mode converter.

Meanwhile, in an exemplary embodiment of the present disclosure, rather than whether a plurality of second speech acquirers are provided in a peripheral device, it is focused that, for example, when mic arrays of two devices have different forms, the image processing device 100 obtains a second speech signal related to this from the peripheral device. Based on this, even if the peripheral device, for example, the remote controller 110, does not transmit a signal based on a user command to the image processing device 100, the image processing device 100 may recognize that the user has requested conversion to a near field speech recognition mode based on a form of the obtained second speech signal, convert modes, and operate. For example, if the second speech signal is input in a stereo form, based on this, the image processing device 100 may operate in the near field speech recognition mode. Thus, the present disclosure will not be particularly limited as to in what circumstances the image processing device 100 is converted to the near field speech recognition mode.

Figure 11:
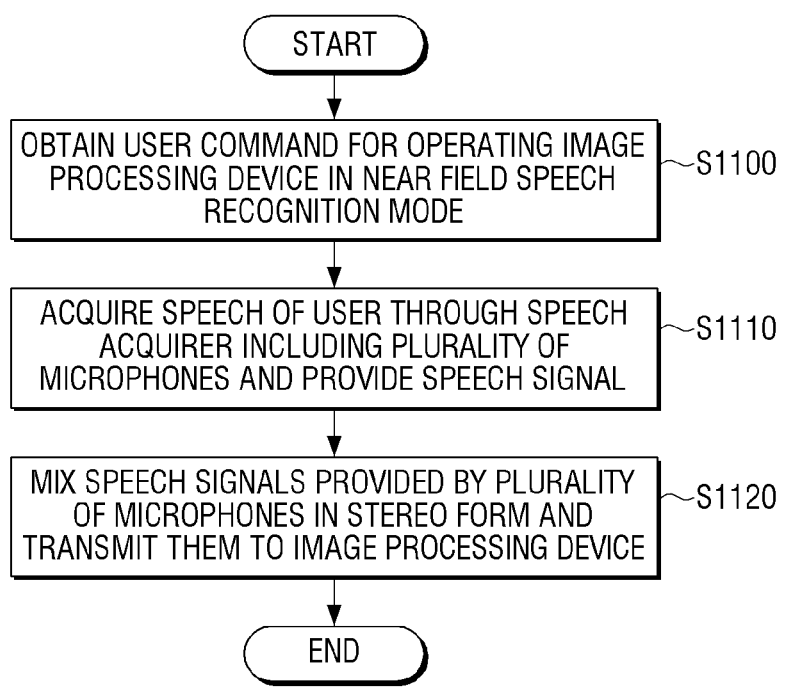
FIG. 11 is a flowchart showing an operation process of a remote controller according to an exemplary embodiment of the present disclosure.

FIG. 11 is a flowchart showing an operation process of a remote controller according to an exemplary embodiment of the present disclosure.

For convenience of description, referring to FIG. 11 together with FIG. 1, the remote controller 110 obtains a user command for operating the image processing device 100 (e.g., a TV, a set-top box, etc.) in a near field speech recognition mode (S1100).

Next, the remote controller 110 acquires a speech of a user through a speech acquirer including a plurality of microphones and provides a speech signal (S1110). The remote controller 110 provides a plurality of speech signals through the plurality of microphones arranged in a second form different from a form in which a plurality of microphones are arranged in the image processing device 100. Generally, a mic performs a function of converting a sound signal into an electric signal. The electric signal may be a speech signal. The speech signal will include noise.

Also, the remote controller 110 mixes the speech signals provided by the plurality of microphones in stereo form and transmits them to the image processing device 100 (S1120). The speech signals of the stereo form provided at this time may be transmitted through a single channel.

Figure 12:
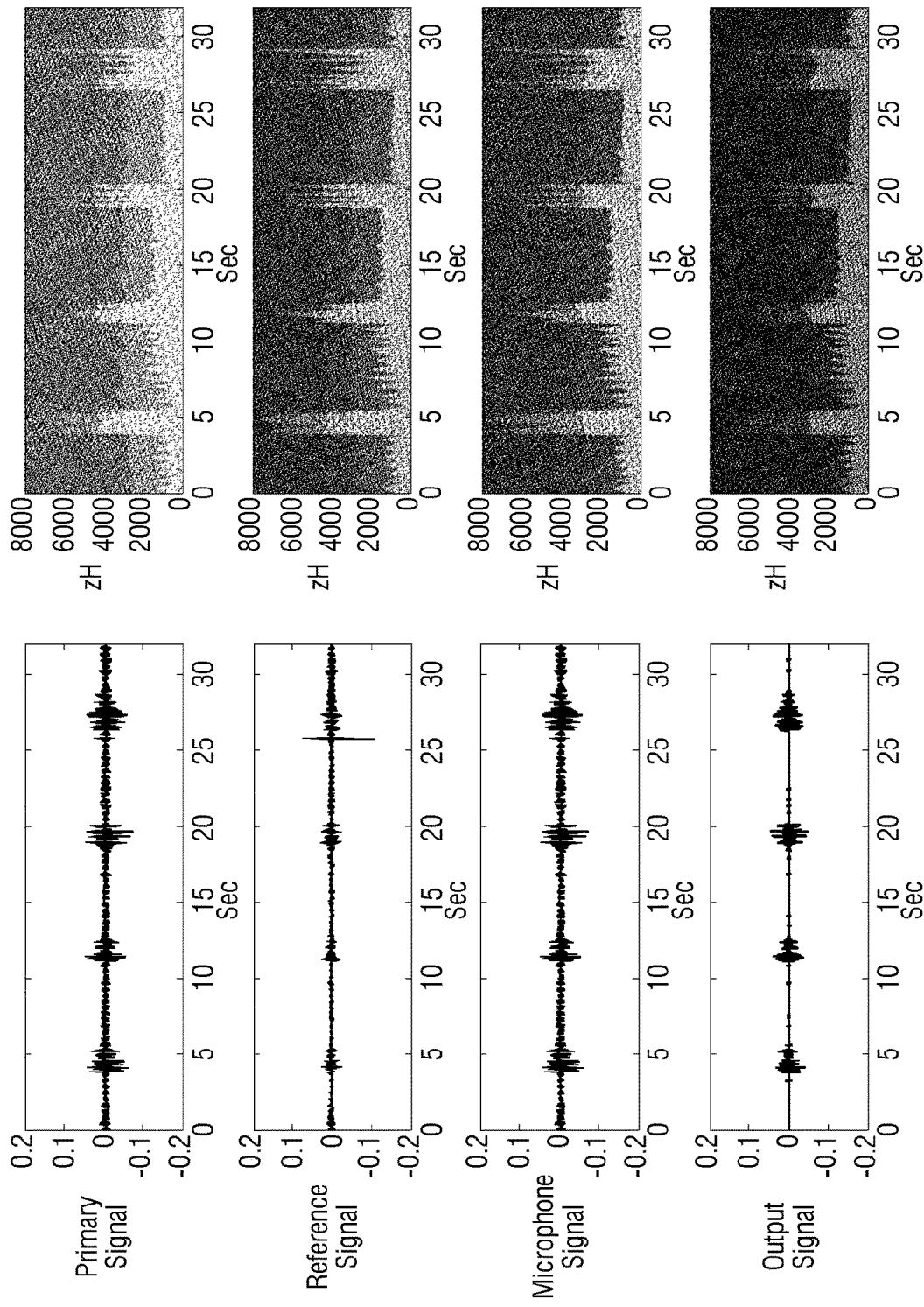
FIGS. 12 and 13 are diagrams showing experimental verification results according to an exemplary embodiment of the present disclosure.
Figure 13:
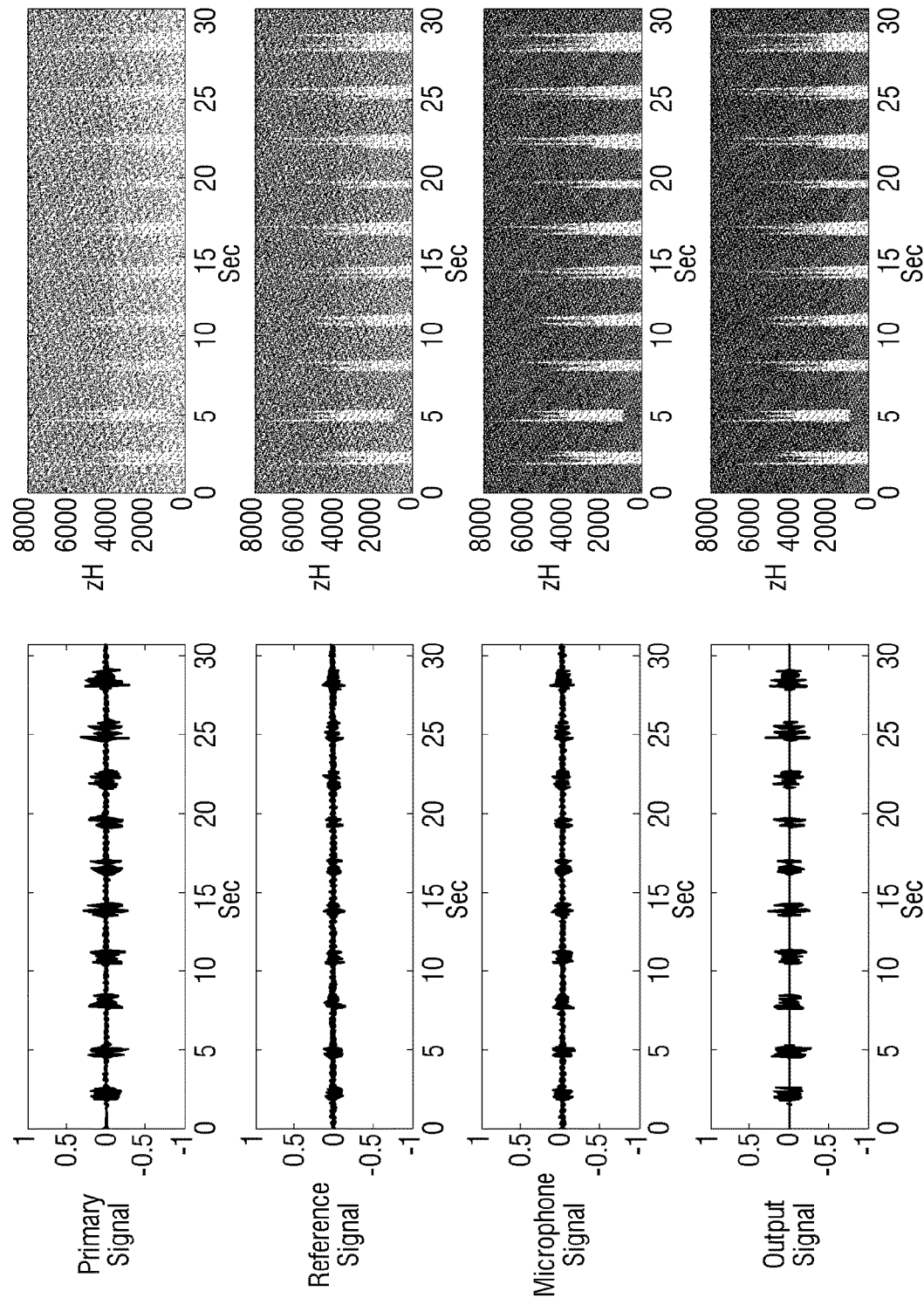

FIGS. 12 and 13 are diagrams showing experimental verification results according to an exemplary embodiment of the present disclosure.

FIG. 12 shows the result of processing a broadside mic array signal applied to the JS9500 smart TV of domestic company S by an exemplary embodiment of the present disclosure. FIG. 13 shows the result of processing an end-fire mic array signal attached to the front/back sides of a remote controller of a smart TV.

As a result of processing signals input to two mic arrays in a noisy environment, it may be confirmed in both mic arrays that a primary signal emphasizes a speech and an interference signal emphasizes an ambient noise, thus the ambient noise is effectively removed from a final output (e.g., a waveform and a spectrum of a last signal) signal of a postprocessor, for example, a post-filter, and a speaker speech is emphasized.

According to an exemplary embodiment of the present disclosure, a signal processor, for example, one program, provided in the image processing device 100 may be used to process both far and near field speech. Even if the surroundings are noisy, when a speaker utters by pressing a button while maintaining a general remote control holding position without having to make a remote controller close to a mouth, deterioration of recognition performance may be prevented. Also, when it is impossible to find the remote controller, a short sentence may be recognized even if the speaker directly utters toward a device. Finally, it is unnecessary to add a DSP chip to which preprocessing is applied for processing a mic signal of the remote controller to the remote controller, and thus the power consumption of the remote controller may be reduced.

Meanwhile, although the case in which all the components configuring an exemplary embodiment of the present disclosure are combined with each other as one component or are combined and operated with each other has been described, the present disclosure is not necessarily limited to an exemplary embodiment. That is, all the components may also be selectively combined and operated with each other as one or more components without departing from the scope of the present disclosure. In addition, although each of all the components may be implemented by one independent hardware, some or all of the respective components which are selectively combined with each other may be implemented by a computer program having a program module performing some or all of functions combined with each other in one or plural hardware. Codes and code segments configuring the computer program may be easily inferred by those skilled in the art to which the present disclosure pertains. The computer program may be stored in non-transitory computer readable medium and may be read and executed by a computer to implement an exemplary embodiment of the present disclosure.

Here, the non-transitory computer readable medium does not mean a medium storing data for a while, such as a register, a cache, a memory, or the like, but means a medium semi-permanently storing data and readable by an apparatus. In detail, the programs described above may be stored and provided in the non-transitory computer readable medium such as a CD, a digital versatile disk (DVD), a hard disk, a Blu-ray disk, a USB, a memory card, a ROM, or the like.

Although exemplary embodiments of the present disclosure have been illustrated and described, the present disclosure is not limited to the abovementioned specific exemplary embodiments, but may be variously modified by those skilled in the art to which the present disclosure pertains without departing from the spirit and scope of the present disclosure as claimed in the claims. In addition, such modifications should also be understood to fall within the scope of the present disclosure.

The invention claimed is:

1. An image processing device comprising:
a first plurality of microphones configured to receive a first voice signal;
a communication interface configured to obtain a second voice signal from an external device; and
a processor configured to:
based on the first voice signal being obtained through the first plurality of microphones, perform a first operation corresponding to a first preprocessing function in which a voice amplification and a voice attenuation are applied to the first voice signal to obtain far field speech, and
based on the second voice signal being obtained through the communication interface, perform a second operation corresponding to a second preprocessing function in which a noise amplification and a noise attenuation are applied to the second voice signal to obtain near field speech,
wherein the first voice signal is a user's speech signal uttered at a far field rather than at the external device and the second voice signal is a user's speech signal at a near field,
wherein the processor comprises:
a post-processor configured to perform post-processing, and
a converter configured to:

based on the first operation corresponding to the first preprocessing function being performed, be provided with the voice amplification and the voice attenuation for the first voice signal, output the first voice signal to which the voice amplification has been applied, as a primary signal, to a first input unit of the post-processor, and output the first voice signal to which the voice attenuation has been applied, as an interference signal, to a second input unit of the post-processor, and based on the second operation corresponding to the second preprocessing function being performed, be provided with the noise amplification and the noise attenuation for the second voice signal, output the second voice signal to which the noise attenuation has been applied, as the primary signal, to the first input unit of the post-processor, and output the second voice signal to which the noise amplification has been applied, as the interference signal, to the second input unit of the post-processor.

2. The image processing device as claimed in claim 1, wherein the first plurality of microphones is arranged at a left side and at a right side of the image processing device, with respect to a user viewing the image processing device, and the external device includes a second plurality of microphones arranged before and after the external device or above and below the external device, with respect to the user viewing the external device.

3. The image processing device as claimed in claim 2, wherein the communication interface is further configured to obtain the second voice signal in which a voice signal provided by the second plurality of microphones is mixed in a stereo form, from the external device via a single channel.

4. The image processing device as claimed in claim 1, further comprising:

a connector configured to connect and disconnect the first plurality of microphones.

5. The image processing device as claimed in claim 1, wherein the post-processor is further configured to provide a first target voice signal obtained as a result of the first operation and a second target voice signal obtained as a result of the second operation to a speech recognizer configured to perform a speech recognition operation.

6. The image processing device as claimed in claim 1, wherein, based on a user command for performing a near field speech recognition operation using the external device, the processor is further configured to obtain the second voice signal through the communication interface.

7. The image processing device as claimed in claim 6, wherein the user command is input by a user in the image processing device or an interface of the external device.

8. An operation method of an image processing device, the operation method comprising:

based on a first voice signal being obtained through a first plurality of microphones of the image processing device, performing a first operation corresponding to a first preprocessing function in which a voice amplification and a voice attenuation are applied to the first voice signal to obtain far field speech; and based on a second voice signal being obtained from an external device, performing a second operation corresponding to a second preprocessing function in which a noise amplification and a noise attenuation are applied to the second voice signal to obtain near field speech, wherein the first voice signal is a user's speech signal uttered at a far field rather than at the external device and the second voice signal is a user's speech signal at a near field, based on the first operation corresponding to the first preprocessing function being performed, obtaining the voice amplification and the voice attenuation for the first voice signal, outputting the first voice signal to which the voice amplification has been applied, as a primary signal, to a first input unit of a post-processor of the image processing device, and outputting the first voice signal to which the voice attenuation has been applied, as an interference signal, to a second input unit of the post-processor, and based on the second operation corresponding to the second preprocessing function being performed, obtaining the noise amplification and the noise attenuation for the second voice signal, outputting the second voice signal to which the noise attenuation has been applied, as the primary signal, to the first input unit of the post-processor, and outputting the second voice signal to which the noise amplification has been applied, as the interference signal, to the second input unit of the post-processor.

9. The operation method as claimed in claim 8, wherein the first plurality of microphones is arranged at a left side and a right side of the image processing device, with respect to a user viewing the image processing device, and wherein the operation method further includes:

obtaining the second voice signal by a second plurality of microphones arranged before and after the external device or above and below the external device, with respect to the user viewing the external device.

10. The operation method as claimed in claim 9, wherein the obtaining the second voice signal further includes:

obtaining the second voice signal in which a voice signal provided by the second plurality of microphones is mixed in a stereo form, from the external device via a single channel.

11. The operation method as claimed in claim 9, further comprising:

based on the first plurality of microphones being connected to a connector of the image processing device, recognizing the first plurality of microphones.

* * * * *